(12) United States Patent
Hoelsaeter et al.

(10) Patent No.: US 6,908,055 B2
(45) Date of Patent: Jun. 21, 2005

(54) SYSTEM FOR EXTRACTING MAGNETIC RECORDING TAPE FROM A TAPE CARTRIDGE FOR ENGAGEMENT WITH A TAKE-UP REEL

(75) Inventors: Hårvard Hoelsaeter, Oslo (NO); Hårvard Holmedal, Oslo (NO)

(73) Assignee: Tandberg Data ASA, Oslo (NO)

( * ) Notice: Subject to any disclaimer, the term of this patent is extended or adjusted under 35 U.S.C. 154(b) by 229 days.

(21) Appl. No.: 10/376,689

(22) Filed: Feb. 27, 2003

(65) Prior Publication Data

US 2004/0169101 A1 Sep. 2, 2004

(51) Int. Cl.[7] .............................................. G11B 15/67
(52) U.S. Cl. ................................. 242/332.4; 242/332.8
(58) Field of Search ........................... 242/332.4, 332.8, 242/348, 348.3, 532.7; 226/92; 360/95, 85

(56) References Cited

U.S. PATENT DOCUMENTS

| | | | | |
|---|---|---|---|---|
| 4,399,936 A | * | 8/1983 | Rueger ......................... 226/92 |
| 4,826,101 A | * | 5/1989 | Smith ........................ 242/332.4 |
| 6,034,839 A | * | 3/2000 | Hamming ....................... 360/95 |
| 6,079,651 A | * | 6/2000 | Hamming ................. 242/332.4 |
| 6,378,796 B1 | * | 4/2002 | Hamming et al. ........ 242/332.4 |
| 6,471,150 B1 | * | 10/2002 | Tsuchiya et al. .......... 242/332.4 |

* cited by examiner

*Primary Examiner*—Eileen D. Lillis
*Assistant Examiner*—Scott J. Haugland
(74) *Attorney, Agent, or Firm*—Schiff Hardin LLP

(57) ABSTRACT

A system disposed in a tape drive, for extracting a magnetic recording tape wound on a single reel in a cartridge received in the tape drive, has a lever arm which moves a gripper hook and a gripper hook follower, in hinged engagement with each other, into and out of the tape cartridge to engage the gripper hook with a leader pin at a free end of the tape. A mechanical gripper switch is rotated after the gripper hook has been moved into the tape cartridge to cause the gripper hook to engage the leader pin. The lever arm then moves the gripper hook follower, the gripper hook and the magnetic tape engaged therewith through a tape guide and through a channel in a take-up reel located in the tape drive, so that the leader pin is positioned at a periphery of the hub of the take-up reel.

9 Claims, 7 Drawing Sheets

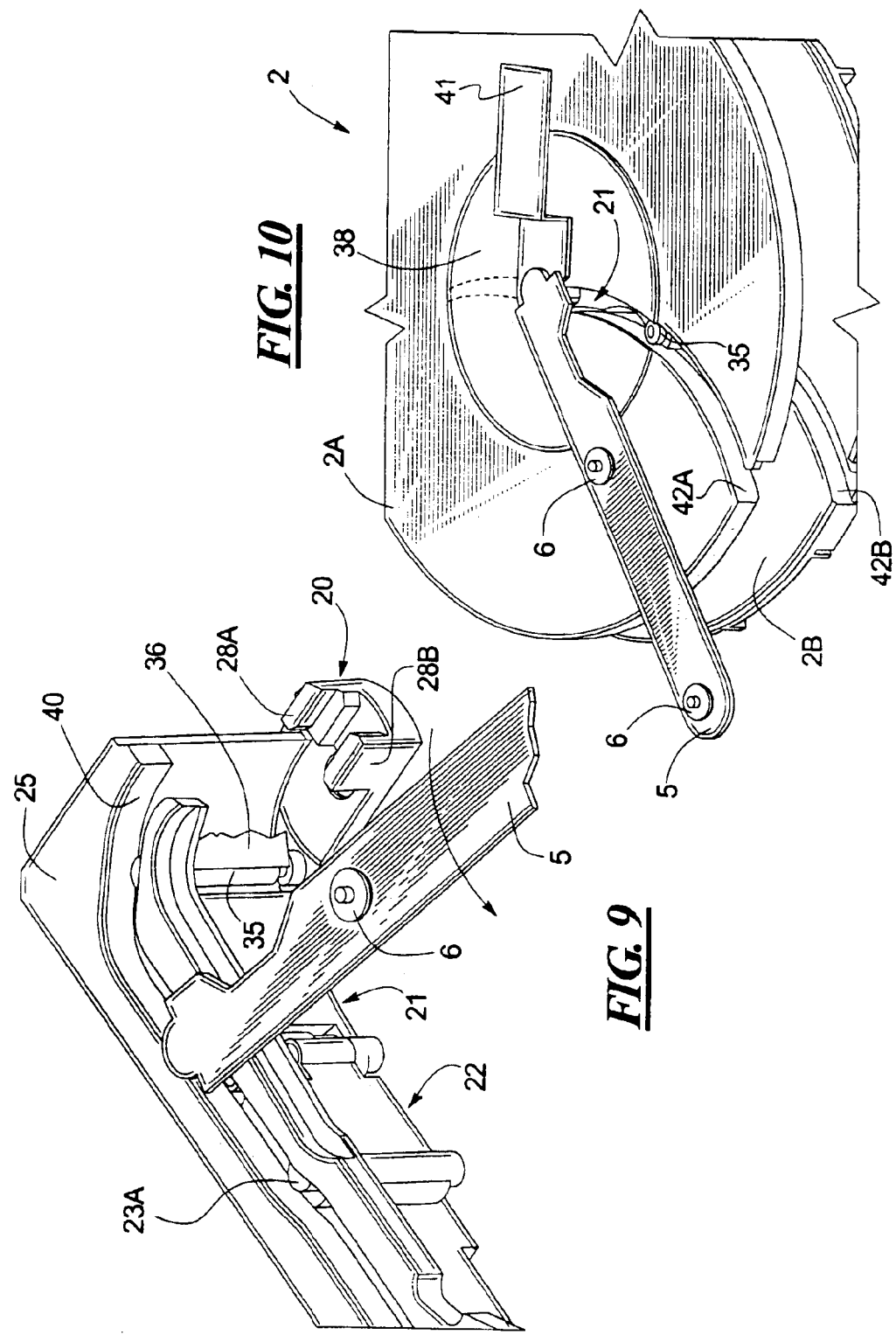

SYSTEM FOR EXTRACTING MAGNETIC RECORDING TAPE FROM A TAPE CARTRIDGE FOR ENGAGEMENT WITH A TAKE-UP REEL

BACKGROUND OF THE INVENTION

1. Field of the Invention

The present invention is directed to a system for extracting magnetic recording tape from a tape cartridge, particularly a single-reel tape cartridge, for engagement with a take-up reel, particularly a take-up reel in a tape drive.

2. Description of the Prior Art

Various types of cartridges or cassettes for magnetic recording tape are known, which are inserted into a tape drive for reading information from, or writing information on, the magnetic recording tape. Single-reel tape cartridges are known which contain only one reel, on which the magnetic recording tape is wound. When such a single-reel cartridge is inserted into a tape drive, a reel or hub in the tape drive serves as the take-up reel. The take-up reel in the tape drive is driven by a motor in the tape drive. The tape from the single reel in the tape cartridge must be extracted from the tape cartridge and threaded to the take-up reel, so that the magnetic recording tape is then wound and unwound between these two reels.

It is known to provide the tape on the single-reel in such a cartridge with a leader pin at the free end thereof, the pin being connected in a suitable manner to the recording tape so that the longitudinal axis of the pin is parallel to the transverse direction of the magnetic recording tape, i.e., the direction perpendicular to the direction along which tape transfer will ensue between that reel and the take-up reel in the drive. Such a pin has opposite (upper and lower) ends which project slightly beyond the width of the recording tape, and which are received in respective recesses in the top and bottom of the cartridge, so that the pin is accessible at an access opening in the cartridge.

Various types of extraction and gripping mechanisms are known which engage the free end of the recording tape at the aforementioned pin, and pull the pin and the recording tape connected thereto into the drive for engagement with the take-up reel. The reliability of such extraction systems is critical to the proper operation of the tape drive, since data are recorded on or read from the recording tape in parallel tracks proceeding parallel to the aforementioned transfer direction. In order to record as much data as possible on the finite area of the recording tape, these data tracks are packed extremely closely together, and therefore accurate threading on the take-up reel is important so that the threaded tape, when wound and unwound between the two reels, will cause the data rows to proceed as straightly as possible between the reel and the cartridge and the take-up reel. Even though the read/write head will usually be equipped with a head positioning arrangement to accurately position the read or write transducer relative to a designated data track, misalignment of the tape between the two reels can still be a source of error in the overall data transfer process.

SUMMARY OF THE INVENTION

It is an object of the present invention to provide a system for extracting a magnetic recording tape from a single-reel cartridge and for threading the extracted tape to a take-up reel in a tape drive, which has a simple structure and operation but nevertheless insures accurate threading of the recording tape.

The above object is inventively achieved in accordance with the principles of the present invention in an extraction system wherein a gripper hook is adapted to engage the tape leader pin in the single-reel cartridge, the gripper hook being in articulated engagement with a gripper follower by means of a pin or axel which proceeds through aligned bores in the gripper hook and the gripper hook follower. The pin or axel is carried on a lever that is moved by engagement with a rotatable wheel. A tape path guide is disposed in the tape drive, which has a channel therein. When the tape cartridge is loaded into the tape drive, the access opening of the tape cartridge, from which the tape leader pin is accessible, is located at one end of the channel in the tape guide, and the other end of the channel in the tape guide is aligned with channels in the top and bottom of the take-up reel. The gripper hook follower, at an opposite side from the side thereof that is engaged with the gripper hook, has upper and lower pegs which have substantially the same size and orientation as the top and bottom pegs of the tape leader pin which engage into respective recesses of the top and bottom of the tape cartridge. The pegs on the gripper hook follower ride in the channel in the tape guide. As the lever is caused to move in an arc by rotation of the wheel, the gripper hook is caused to engage the leader pin and begin to extract the tape from the cartridge. Because the pegs on the gripper hook follower are already engaged in the channel of the tape guide, and since the gripper hook is attached to the gripper hook follower by the aforementioned articulated engagement, the top and bottom of the tape leader pin are also caused to move into the channel and follow the channel to the aforementioned channels in the top and bottom of the take-up reel.

The channels in the top and bottom of the take-up reel proceed to the hub of the take-up reel, and thus as the lever continues movement along the arc, the leader pin and the recording tape connected thereto are brought to the tape hub and the leader pin engages the tape hub, thereby threading the recording tape on the tape hub of the take-up reel.

DESCRIPTION OF THE DRAWINGS

FIG. 9 is a view from above, with the tape drive housing removed, showing movement of the gripper hook follower, the gripper hook and the tape engaged therewith through the tape guide.

FIG. 10 is a view from above, with the tape drive housing removed, showing threading of the magnetic recording tape onto the hub of the take-up reel in the tape drive.

DESCRIPTION OF THE PREFERRED EMBODIMENTS

Figure 1:
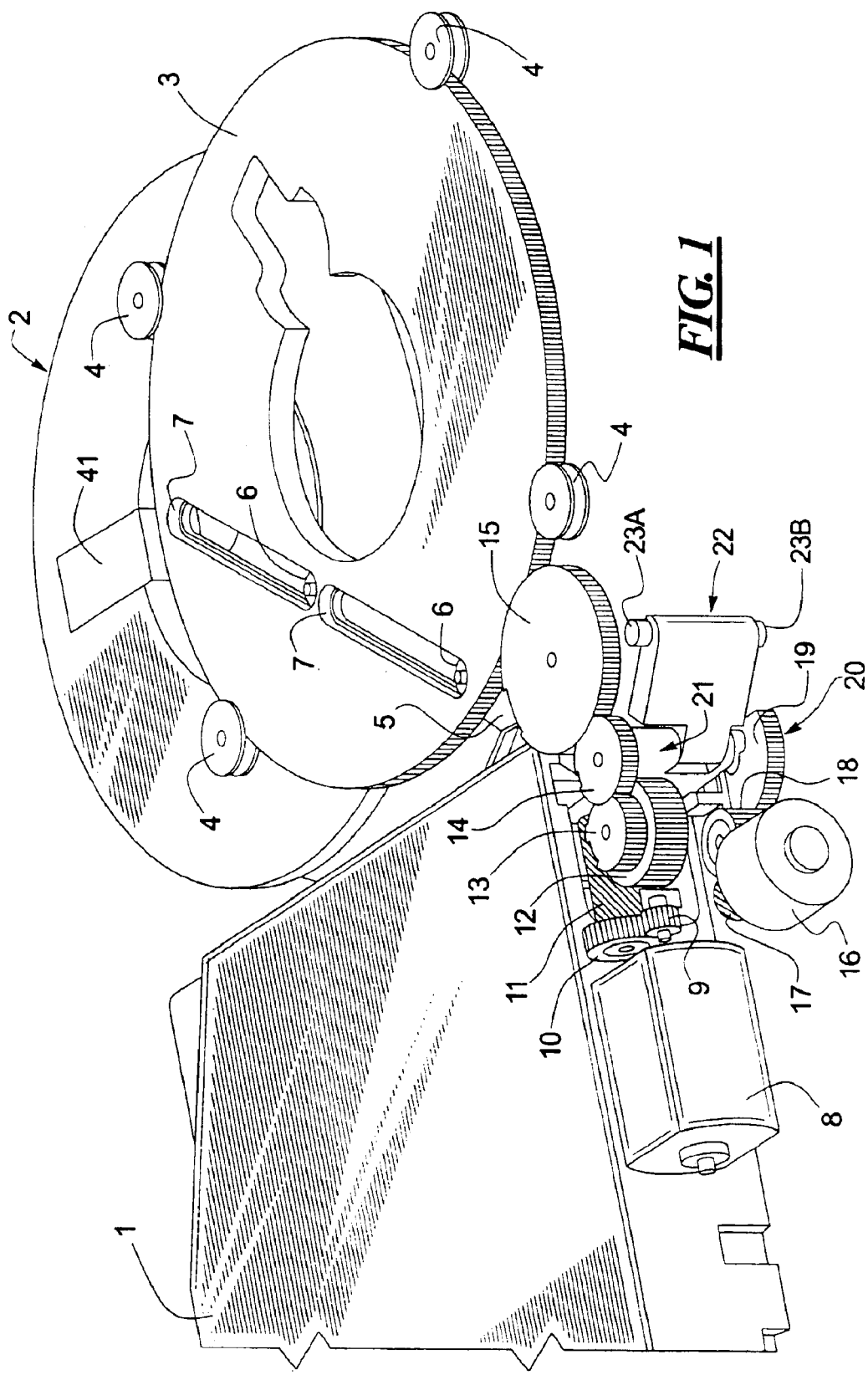
FIG. 1 is a perspective view, with the exterior housing of the tape drive removed, of a single-reel tape cartridge loaded into a tape drive having an extraction system constructed and operating in accordance with the present invention.

FIG. 1 shows various components of the tape extraction system in accordance with the invention. These components are contained within a housing of a tape drive, but the housing has been removed from FIG. 1 for clarity. The components, as needed, are mounted to respective walls of the housing in a suitable manner, the details of which are not important to the structure or operation of the tape extraction system, and therefore the various mounting arrangements are not shown in the Figures.

As shown in FIG. 1, a single-reel tape cartridge 1 is loaded in the drive. The cartridge 1 contains a reel 39 (see FIG. 8) of magnetic recording tape, which must be extracted from the cartridge 1 and threaded onto a take-up reel 2 of the tape drive.

The tape extraction system includes a rotatable wheel 3, having gear teeth at a periphery thereof. The wheel 3 is held in place by four rotatable wheel supports 4 which engage the periphery of the wheel 3. The wheel supports 4 are mounted to a top cover 24 (see FIG. 2) of the tape drive and allow free rotation of the wheel 3. The wheel supports 4 are not provided with gear teeth.

The wheel 3 has two slots 7 therein at one side thereof, which respectively engage rollers 6 of a lever arm 5. As the wheel 3 rotates (in the manner described below) the rollers 6 slide in the respective slots 7, causing the end of the lever arm 5 which projects beyond the periphery of the wheel 3 to execute an arcuate motion. The direction of the arcuate motion is dependent on the direction of rotation of the wheel 3.

A drive motor 8 is operated to cause rotation of the wheel 3. This rotation is accomplished by a drive gear 9 connected to a drive shaft of the motor 8, which engages a gear 10. The gear 10 is co-rotationally fixed to a worm 11. The worm 11 engages a lower spur gear 12, which is co-rotationally fixed to an upper spur gear 13. The upper spur gear 13 engages a first intermediate gear 14, which in turn engages a second intermediate gear 15, which engages the gear teeth at the periphery of the wheel 3, thereby causing rotation of the wheel 3 in a direction dependent on the rotational direction of the drive shaft of the motor 8.

Another motor 16 is provided as part of the extraction system, which has a drive shaft on which a worm 17 is co-rotationally mounted. The worm 17 engages an intermediate gear 18, which engages gear teeth on the periphery of a flange 19 of a gripper switch 20. The gripper switch 20 is thus caused to rotate by the operation of the motor 16, for the purpose described in more detail below.

As can also be seen in FIG. 1, a gripper hook 21 engages the gripper hook switch 20. This engagement is accomplished by means of a peg 32 (see FIG. 4) disposed at a bottom of the gripper hook 21, which non-permanently engages a bore 27 (see FIG. 3) of the gripper switch 20. The gripper hook 21 thus proceeds between brackets 28A and 28B (see FIG. 3) of the gripper switch 20.

The gripper hook 21 engages a gripper hook follower in a manner described in more detail below with an articulated engagement or hinge, allowing pivoting of the gripper hook and the gripper hook follower 22 relative to each other. As can also be seen in FIG. 1, and as shown in FIG. 5 as well, the gripper hook follower 22 has an upper peg 23A and a lower peg 23B.

Figure 2:
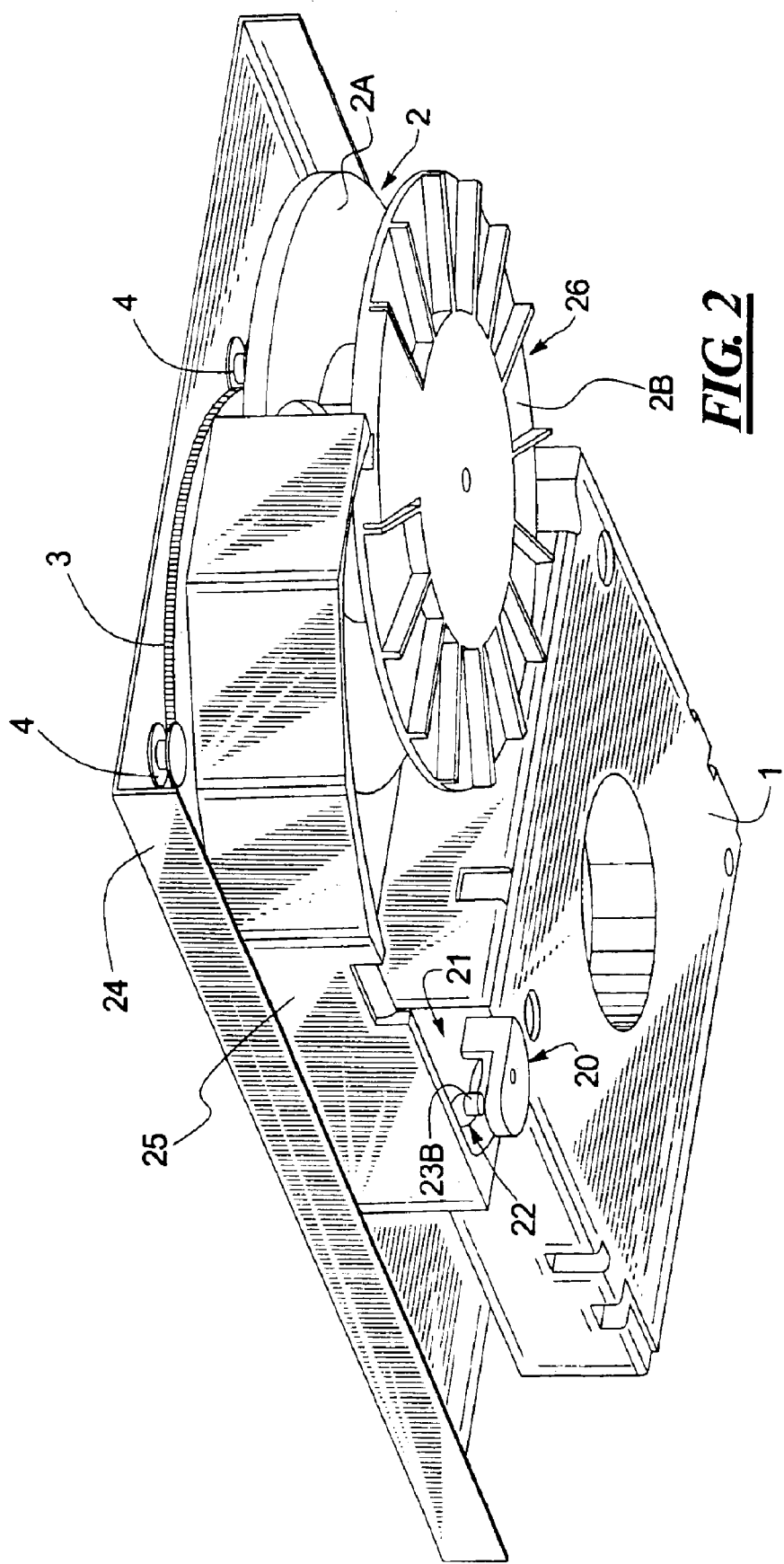
FIG. 2 shows certain components of the tape drive from below, with the bottom and sides of the tape drive being removed.

Certain of these components are shown from below in FIG. 2 as well. FIG. 2 also shows a tape guide 25 mounted to the top cover 24 of the tape drive. A fan arrangement 26 can also be seen in FIG. 2, which is located on the bottom surface of the bottom flange 2B of the take-up reel 2, which also has a top flange 2A. This fan arrangement 26 is not important to the structure or operation of the extraction system.

Figure 3:
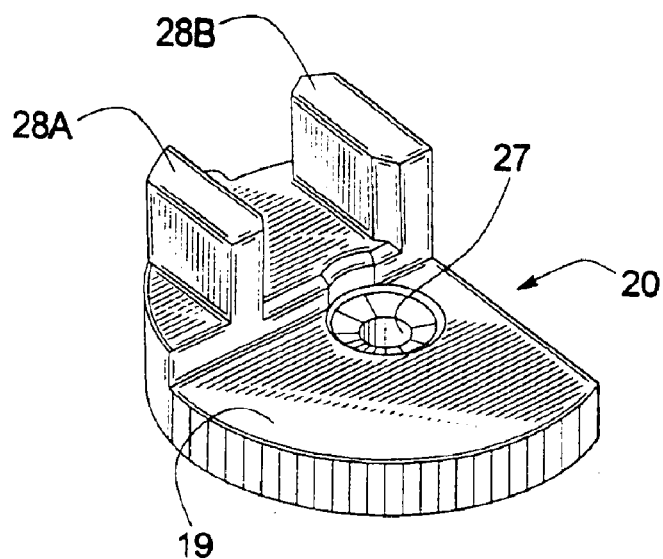
FIG. 3 is a perspective view of a switch gripper in the extraction system in accordance with the present invention.

The gripper switch 20 is shown in FIG. 3. As already noted, the gripper switch 20 has a lower flange 19 with gear teeth at a periphery thereof, with a bore 27 proceeding through the flange 19. Next to the bore 27 are upwardly projecting brackets or guides 28A and 28B.

Figure 4:
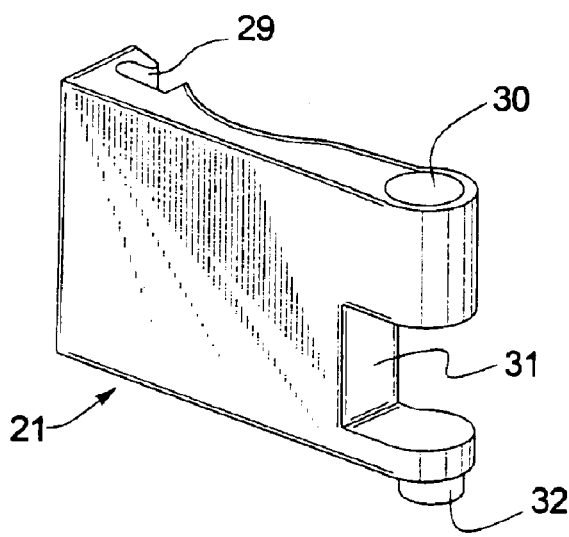
FIG. 4 is a perspective view of a gripper hook in the extraction system in accordance with the present invention.
Figure 5:
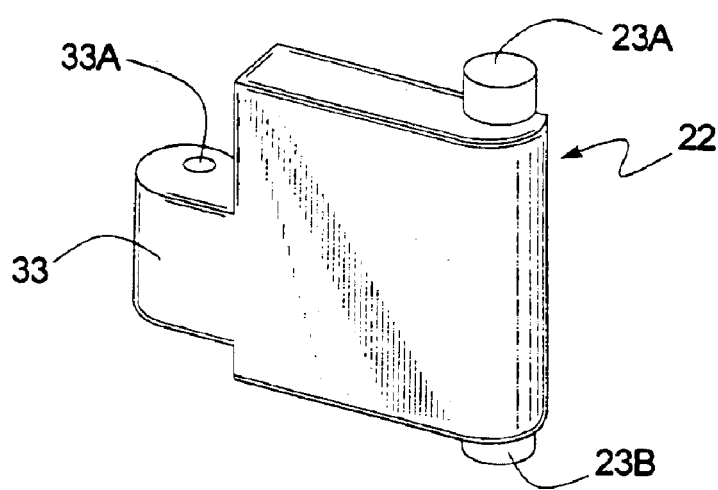
FIG. 5 is a perspective view of a gripper follower in the extraction system in accordance with the present invention.

The gripper hook 21 is shown in FIG. 4 and the gripper hook follower 22 is shown in FIG. 5. As can be seen in FIG. 4, the gripper hook 21 has a hook 29 at one end thereof, adapted to engage the tape leader pin 35, in the manner described in detail below. The gripper hook 21 at its other end has a bore 30, a recess 31 and a bottom peg 32.

Figure 6:
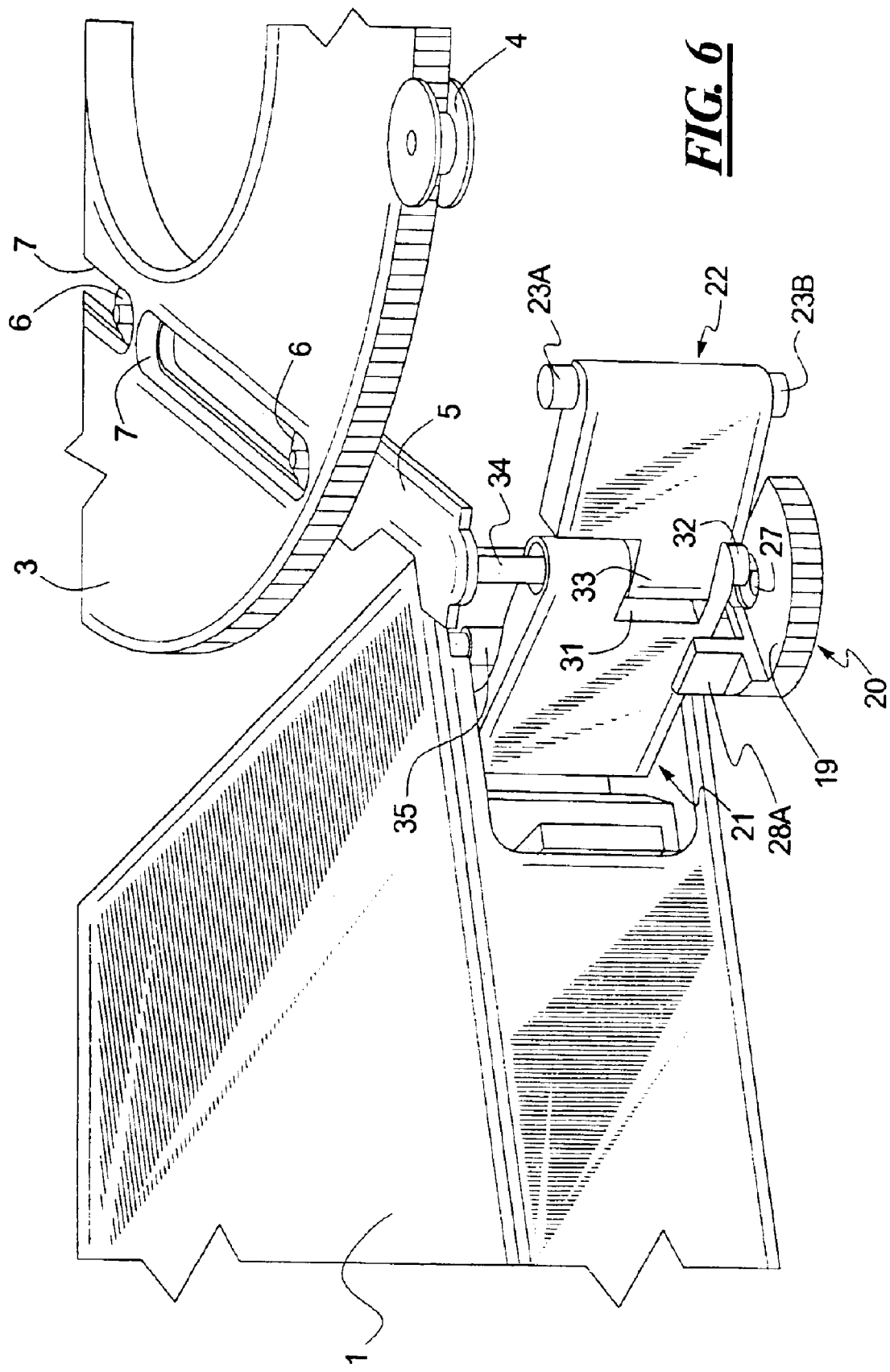
FIG. 6 shows the tape extraction system in accordance with the invention in an initial stage in the tape extraction procedure, preparing for engagement with the tape leader pin.

The gripper hook follower 22, as shown in FIG. 5, has a projection 33 at one end, which fits into the recess 31 in the gripper hook 21. As can be seen in FIG. 6, for example, a pin or axle 34 extending downwardly from the bottom of the lever arm 5 proceeds through the bore 30 and through a bore 33A in the projection 33, thereby forming an articulated or hinged engagement between the gripper hook 21 and the gripper hook follower 22, allowing those components to pivot relative to each other around the axle 34.

Figure 7:
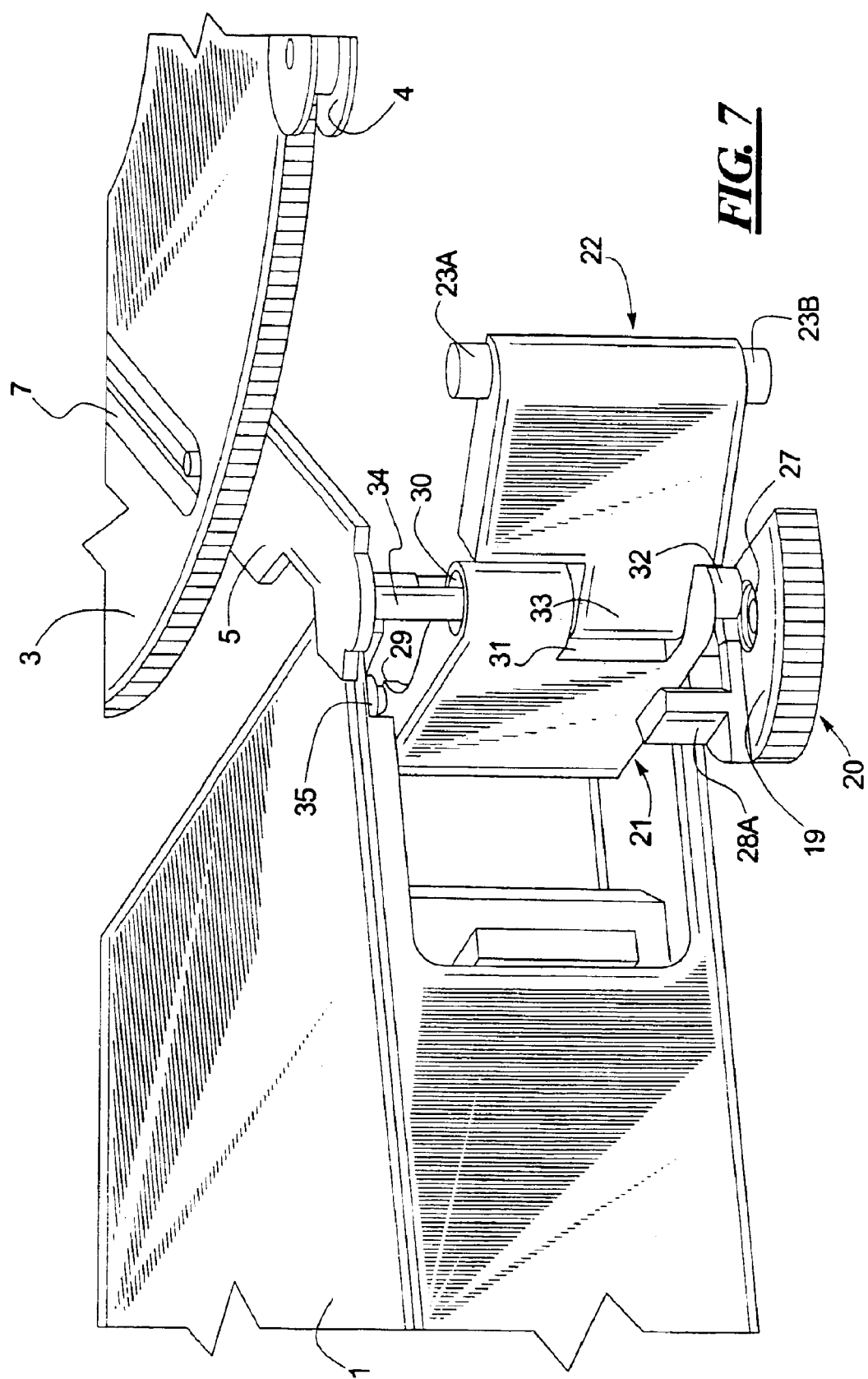
FIG. 7 shows the tape extraction system in accordance with the invention upon engagement with the tape leader pin.
Figure 8:
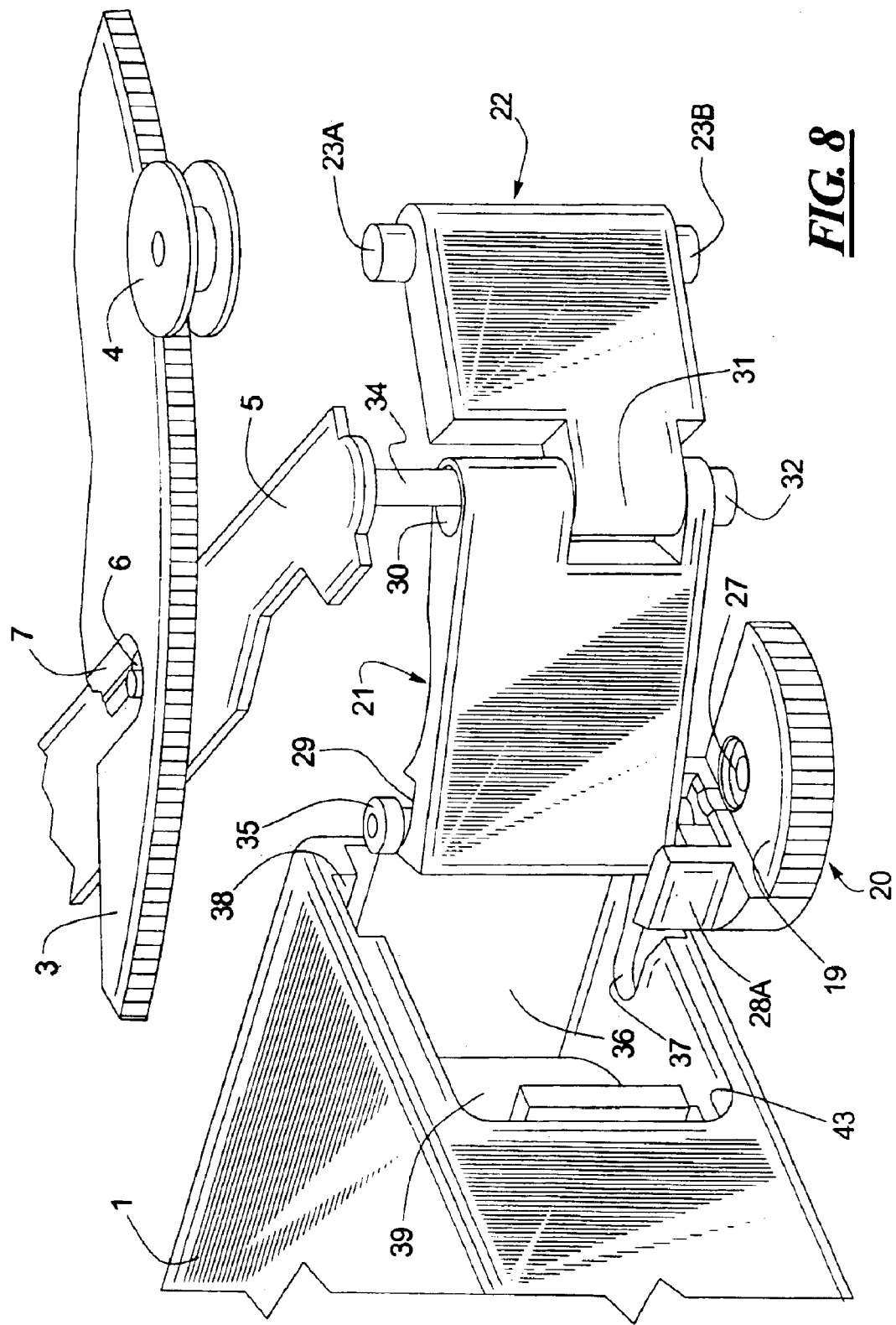
FIG. 8 shows the tape extraction system in accordance with the invention after engaging the tape leader pin, and beginning to extract the recording tape from the cartridge.

FIGS. 6, 7 and 8 respectively show three stages, which occur in succession, in a tape extraction procedure using the tape extraction system. This procedure will be described in more detail below. As can be seen from FIG. 8, the cartridge 1, as noted above, contains a reeled tape pack 39 of magnetic recording tape, the free end 36 thereof being accessible via an access opening 43 in the cartridge 1. As is known, the housing of the cartridge 1 has a recess 37 in a bottom wall thereof in recess 38 in a top wall thereof. The hub of the reel (not shown) for the tape pack 39 in the cartridge 1 has a suitable biasing arrangement, such as a spring, which biases the reel to urge the free end 36 of the recording tape into the housing of the cartridge 1. The top and bottom of the leader pin 35, however, proceed into, and are engaged by, the respective recess 38 and 37, so that the free end 36 is held at the access opening 43. The pin 35, engaged in the recesses 37 and 38, is accessible via the access opening 43.

The tape guide 25 as shown in FIG. 9 has a channel 40 therein in which the upper peg 23A of the gripper hook follower 22 is guided, as is the pin 34 of the lever arm 5, which forms the articulated hinge between the gripper hook 21 and the gripper hook follower 22. The tape 36 (only a portion of which is shown in FIG. 9) also follows through the path of the channel 40 in the tape guide 25 as the lever arm 5 is moved in the direction of the curved arrow shown in FIG. 9.

An extraction procedure will be explained on the basis of FIGS. 1 and 6–10.

The motor 8 is operated to rotate the wheel 3 to cause the lever arm 5 to move toward the left in FIG. 6. In timed relation to the operation of the motor 8 (such as by means of a suitable control circuit, not shown) the motor 16 is operated to rotate the gripper switch 20 so that it rotates slightly counterclockwise. Although not shown in FIG. 6 for clarity, the upper and lower pegs 23A and 23B are, as always, engaged in the channel 40 of the tape guide 25. The counterclockwise rotation of the gripper switch 20 as the lever arm 5 causes the gripper hook 21 to move into the access opening 43 without the hook 29 engaging the leader pin 35. At this point the motor 16 is caused to operate in the reverse direction, thereby causing a clockwise rotation of the gripper switch 19, so that the hook 29 is now in a position, within the access opening 43, to engage the leader pin 35.

The direction of operation of the motor 8 is then reversed, thereby causing the wheel 3 to rotate in the opposite direction and move the lever arm 5 toward the right in FIG. 7, causing the hook 29 to engage the leader pin 35. Continued movement of the lever arm 5 toward the right, as shown in FIG. 8 causes the tape 36 to begin to be extracted from the cartridge 1. Further movement of the lever arm 5 in this direction causes the gripper hook 21 to enter into the channel 40 of the tape guide, also pulling the leader pin 35 with the tape 36 connected thereto into the tape guide 25, following the channel 40.

As shown in FIG. 10, the drive motor (not shown) for the take-up reel 2 in the tape drive is caused to operate to bring channels 42A and 42B respectively in the top flange 2A and the bottom flange 2B of the take-up reel 2 into alignment with the exit of the channel 40 in the tape guide 25. The continued movement of the lever arm 5 moves the gripper hook follower 22 and the gripper hook 21 through these channels 42A and 42B into the hub 38 of the take-up reel 2. The pin 34 of the lever arm 5 is stopped by engagement in a recess in a bracket 41. The channel proceeds through the hub 38 as indicated by the dashed lines so that the gripper hook follower 22 is located in this extension of the channel and the gripper hook 21 is located at the other side, with the leader pin 35 located at the periphery of the hub 38. The magnetic recording tape (which is not shown in FIG. 10 for clarity) is then wound on the periphery of the hub 38 as the take-up reel 2 is rotated. The diameter of the axle 34 is sufficiently smaller than the diameter of the bores 30 and 33A respectively in the gripper hook 21 and the gripper hook follower 22 so that the axle 34 can remain in place without hindering rotation of the take-up reel 2.

Removal of the recording tape from the take-up reel 2, and return thereof to the cartridge 1 proceeds in a manner reverse to the extraction procedure, with the only difference being that the gripper switch 20 is not rotated, i.e., it is left in the position it was in when the tape was extracted from the cartridge 1, as the leader pin 35 is moved into the cartridge 1. Then the motor 16 is operated to cause the gripper switch 20 to rotate slightly counterclockwise, so that the gripper hook 21 held in the brackets 28A and 28B is rotated away from the leader pin 35, thereby freeing the hook 29 therefrom, so the gripper hook 21 can then be moved out of the cartridge 1.

Although modifications and changes may be suggested by those skilled in the art, it is the intention of the inventors to embody within the patent warranted hereon all changes and modifications as reasonably and properly come within the scope of their contribution to the art.

We claim as our invention:

1. A system for extracting a magnetic recording tape wound on a single reel in a cartridge, said tape having a free end in said cartridge with a leader pin attached thereto, said system comprising, in a tape drive adapted to receive said cartridge:
    a take-up reel having a central hub and top and bottom flanges, said top and bottom flanges each having a channel therein proceeding from a periphery thereof to said hub, the respective channels being in registration with each other;
    a gripper hook adapted to engage said leader pin;
    a lever arm having an axle projecting therefrom;
    a gripper hook follower, said axle proceeding through said gripper hook and said gripper hook follower to form a hinged engagement of said gripper hook and said gripper hook follower;
    a tape guide having a guide channel therein in which said gripper hook follower is held and guided;
    a rotatable, mechanical gripper switch having a pair of brackets through which said gripper hook proceeds; and
    an operating mechanism engaging each of said lever arm and said gripper switch for moving said lever arm in an arcuate path in a first direction to enter said gripper hook into said cartridge with said gripper switch rotated to cause said gripper hook to pass by said leader pin and for rotating said gripper switch to move said gripper hook to engage said leader pin in said cartridge and for moving said lever arm in said arcuate path in a second direction, opposite to said first direction, to extract said leader pin and said tape from said cartridge and to move said gripper hook follower, said gripper hook, said leader pin engaging said gripper hook, and said tape through said channel in said tape guide and into said channels in said take-up reel toward said hub to position said leader pin at a periphery of said hub.

2. A system as claimed in claim 1 wherein said hub in said take-up reel has a channel therein proceeding inwardly from said periphery of said hub and aligned with the respective channels in said top and bottom flanges, and wherein said operating mechanism moves said lever arm in said second direction to move said gripper hook follower and said gripper hook through said channel in said hub to position said leader pin at said periphery of said hub.

3. A system as claimed in claim 2 further comprising a bracket disposed above said take-up reel and having a recess therein engageable with said axle of said lever arm to arrest said movement of said lever arm in said second direction at a point where said leader pin is positioned at said periphery of said hub.

4. A system as claimed in claim 1 wherein said gripper hook has a hook at one end thereof adapted to engage said leader pin, and projections at said opposite end with a recess between said projections and a bore proceeding through said projections, and wherein said gripper hook follower has a projection disposed in said recess with a bore therein, said axle proceeding through said bores in said projections of said gripper hook and said bore in said projection of said gripper hook follower to form said hinged engagement.

5. A system as claimed in claim 1 wherein said operating mechanism comprises a first motor and a first drive train engaging said first motor with said lever arm, and a second motor and a second drive train engaging said second motor with said gripper switch.

6. A system as claimed in claim 1 wherein said operating mechanism comprises a rotatable wheel in sliding engagement with said lever, a drive motor, and a drive train engaging said drive motor with said wheel to rotate said wheel in a first rotational direction to produce said movement of said lever arm in said arcuate path in said first direction, and for rotating said wheel in a second rotational direction, opposite to said first rotational direction, to move said lever arm in said arcuate path in said second direction.

7. A system as claimed in claim 6 wherein said wheel has an axis of rotation and at least one slot disposed between a periphery of said wheel and said axis of rotation, and wherein said lever arm has a roller which slides in said slot as said wheel is rotated in said first and second rotational directions.

8. A system as claimed in claim 1 wherein said gripper switch has a flange with gear teeth disposed at a periphery thereof, and wherein said operating mechanism comprises a motor and a drive train engaging said gear teeth at said periphery of said flange, said motor rotating said gripper switch in a first rotational direction to cause said gripper hook in said brackets of said gripper switch to pass by said leader pin, and rotating said gripper switch in a second rotational direction opposite to said first rotational direction, for causing said gripper hook in said brackets of said gripper switch to engage said leader pin.

9. A system as claimed in claim 1 wherein said gripper hook follower has a first end forming said hinged engagement with said gripper hook, and a second end, and comprises top and bottom pegs at said second end proceeding through said tape guide and said channels in said top and bottom flanges of said take-up reel.

* * * * *